(12) United States Patent
David et al.

(10) Patent No.: US 9,764,292 B2
(45) Date of Patent: Sep. 19, 2017

(54) POROUS POLYMERIC MEMBRANE WITH HIGH VOID VOLUME

(71) Applicant: Pall Corporation, Port Washington, NY (US)

(72) Inventors: Yolando David, Glen Cove, NY (US); Shane Edward Harton, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 173 days.

(21) Appl. No.: 14/194,001

(22) Filed: Feb. 28, 2014

(65) Prior Publication Data
US 2015/0246326 A1    Sep. 3, 2015

(51) Int. Cl.
*B01D 71/34* (2006.01)
*B01D 69/02* (2006.01)
(Continued)

(52) U.S. Cl.
CPC .......... *B01D 69/12* (2013.01); *B01D 67/003* (2013.01); *B01D 67/0009* (2013.01); *B01D 69/02* (2013.01); *B01D 71/34* (2013.01); *B01D 2323/18* (2013.01); *B01D 2323/24* (2013.01); *B01D 2325/021* (2013.01); *B01D 2325/022* (2013.01)

(58) Field of Classification Search
None
See application file for complete search history.

(56) References Cited

U.S. PATENT DOCUMENTS 2,913,419 A    11/1959    Alexander
2,974,108 A    3/1961    Alexander
(Continued)

FOREIGN PATENT DOCUMENTS

CA    2509628 C    11/2007
DE    10058258 A1    8/2002
(Continued)

OTHER PUBLICATIONS

Cai et al., "An improved convective self-assembly method for the fabrication of binary colloidal crystals and inverse structures", *Journal of Colloid and Interface Science*, 380, 42-50 (2012).
(Continued)

*Primary Examiner* — Krishnan S Menon
(74) *Attorney, Agent, or Firm* — Leydig Voit & Mayer

(57) ABSTRACT

Membranes comprising first and second microporous surfaces, and, a porous bulk between the surfaces, the bulk comprising first and second regions; the first region comprising a first set of pores having outer rims, and having controlled pore size, and a second set of pores connecting the outer rims of the first set of pores, the second set of pores having a controlled pore size, and a polymer matrix supporting the first set of pores; the second region comprising a third set of pores having outer rims, and having a controlled pore size, and a fourth set of pores connecting the outer rims of the third set of pores, the fourth set of pores having a controlled pore size, and a polymer matrix supporting the third set of pores; and methods of making and using the membranes, are disclosed.

3 Claims, 7 Drawing Sheets

(51) Int. Cl.
*B01D 69/12* (2006.01)
*B01D 67/00* (2006.01)

(56) References Cited

U.S. PATENT DOCUMENTS

| | | | |
|---|---|---|---|
| 4,177,228 | A | 12/1979 | Prolss |
| 4,188,418 | A | 2/1980 | Livingston |
| 4,289,600 | A | 9/1981 | Lazarz et al. |
| 4,289,681 | A | 9/1981 | Nauroth et al. |
| 4,764,497 | A | 8/1988 | Yuasa et al. |
| 4,940,571 | A | 7/1990 | Su et al. |
| 5,024,826 | A | 6/1991 | Linton |
| 5,100,581 | A | 3/1992 | Watanabe et al. |
| 5,102,917 | A | 4/1992 | Bedwell et al. |
| 5,221,497 | A | 6/1993 | Watanabe et al. |
| 5,453,260 | A | 9/1995 | Nakazawa et al. |
| 5,938,874 | A | 8/1999 | Palomo et al. |
| 6,372,806 | B1 | 4/2002 | Keiser et al. |
| 6,548,264 | B1 | 4/2003 | Tan et al. |
| 6,680,013 | B1 | 1/2004 | Stein et al. |
| 6,770,130 | B2 | 8/2004 | Kato et al. |
| 6,800,267 | B2 | 10/2004 | Schubert et al. |
| 6,855,427 | B2 | 2/2005 | Kunkeler et al. |
| 6,890,436 | B2 | 5/2005 | Komatsu et al. |
| 6,906,109 | B2 | 6/2005 | Paszkowski |
| 6,929,764 | B2 | 8/2005 | Jiang et al. |
| 7,438,875 | B2 | 10/2008 | Do et al. |
| 7,901,727 | B2 | 3/2011 | Hofmann et al. |
| 8,003,707 | B2 | 8/2011 | Holland |
| 8,052,788 | B2 | 11/2011 | MacDonald |
| 8,163,388 | B2 | 4/2012 | Do et al. |
| 8,168,563 | B2 | 5/2012 | Do et al. |
| 8,211,193 | B2 | 7/2012 | Mahulikar et al. |
| 8,288,455 | B1 | 10/2012 | Miller |
| 8,309,113 | B2 | 11/2012 | Hofmann et al. |
| 8,431,034 | B2 | 4/2013 | Petronis et al. |
| 8,518,361 | B2 | 8/2013 | Chang et al. |
| 2002/0011443 | A1* | 1/2002 | Komatsu ............. B01D 63/024 210/650 |
| 2003/0107150 | A1 | 6/2003 | Hamanaka et al. |
| 2005/0234136 | A1 | 10/2005 | Holland et al. |
| 2006/0283095 | A1 | 12/2006 | Mahulikar et al. |
| 2007/0125701 | A1* | 6/2007 | Ramaswamy ..... B01D 67/0062 210/490 |
| 2009/0220426 | A1 | 9/2009 | Fujishima et al. |
| 2010/0155325 | A1 | 6/2010 | Zhang et al. |
| 2010/0272996 | A1 | 10/2010 | Holmes et al. |
| 2010/0311871 | A1 | 12/2010 | Suemura et al. |
| 2011/0251057 | A1 | 10/2011 | Keiser et al. |
| 2012/0107601 | A1 | 5/2012 | Weitz et al. |
| 2012/0276275 | A1 | 11/2012 | Ergang et al. |
| 2013/0112613 | A1 | 5/2013 | Kang et al. |
| 2013/0115295 | A1 | 5/2013 | Wang et al. |
| 2013/0134081 | A1 | 5/2013 | Kang et al. |
| 2013/0146539 | A1 | 6/2013 | Larue et al. |
| 2013/0199995 | A1 | 8/2013 | Jiang et al. |
| 2015/0246320 | A1 | 9/2015 | David et al. |
| 2015/0246321 | A1 | 9/2015 | Wu et al. |
| 2015/0246322 | A1 | 9/2015 | Larue et al. |
| 2015/0246323 | A1 | 9/2015 | Singh et al. |
| 2015/0246324 | A1 | 9/2015 | Singh et al. |
| 2015/0246325 | A1 | 9/2015 | Singh et al. |
| 2015/0246328 | A1 | 9/2015 | David et al. |

FOREIGN PATENT DOCUMENTS

| | | |
|---|---|---|
| DE | 102006010831 A1 | 9/2007 |
| DE | 102006036863 A1 | 2/2008 |
| EP | 477689 A1 | 4/1992 |
| EP | 1 166 859 A2 | 1/2002 |
| EP | 2 476 724 A1 | 7/2012 |
| JP | 56-11931 A | 2/1981 |
| JP | 03-277639 A | 12/1991 |
| JP | 2003-93852 A | 4/2003 |
| JP | 2008-272636 A | 11/2008 |
| JP | 2012-107144 A | 6/2012 |
| JP | 2012-254404 A | 12/2012 |
| SG | 10201401356 T | 12/2014 |
| WO | WO 2005/063365 A1 | 7/2005 |
| WO | WO 2012/097967 A1 | 7/2012 |
| WO | WO 2013/130893 A2 | 9/2013 |
| WO | WO 2014/175011 A1 | 10/2014 |

OTHER PUBLICATIONS

Ding et al., "Experimental Investigation of Particle-Assisted Wetting", *Journal of American Chemical Society*, 128, 4930-4931 (2006).

Gates et al., "Fabrication and Characterization of Porous Membranes with Highly Ordered Three-Dimensional Periodic Structures", *Chemistry of Materials*, 11, 2827-2836 (1999).

Hoa et al., "Preparation of porous materials with ordered hole structure", *Advances in Colloid and Interface Science*, 121, 9-23 (2006).

Holland et al ., "Synthesis of Highly Ordered, Three-Dimensional, Macroporous Structures of Amorphous or Crystalline Inorganic Oxides, Phosphates, and Hybrid Composites", *Chemistry of Materials*, 11, 795-805 (1999).

Jiang et al., "Large-Scale Fabrication of Wafer-Size Colloidal Crystals, Macroporous Polymers and Nanocomposites by Spin-Coating", *Journal of American Chemical Society*, 126, 13778-13786 (2004).

Jiang et al., "Single-Crystal Colloidal Multilayers of Controlled Thickness", Chemistry of Materials, 11, 2132-2140 (1999).

Jiang et al., "Template-Directed Preparation of Macroporous Polymers with Oriented and Crystalline Arrays of Voids", *Journal of American Chemical Society* 121, 11630-11637 (1999).

Johnson et al., "Ordered Mesoporous Polymers of Tunable Pore Size from Colloidal Silica Templates", *Science Magazine*, 283, 963-965 (1999).

Kellenberger et al., "Soluble nanoparticles as removable pore templates for the preparation of polymer ultrafiltration membranes", *Journal of Membrane Science*, 387-388, 76-82 (2012)r.

Li et al., "Preparation of mesoporous calcium doped silica spheres with narrow size dispersion and their drug loading and degradation behavior", *Microporous and Mesoporous Materials*, 102, 151-158 (2007).

Mitchell et al., "Iron(III)-Doped, Silica Nanoshells: A Biodegradable Form of Silica", *Journal of American Chemical Society*, 134, 13997-14003 (2012).

Park et al., "Fabrication of Three-Dimensional Macroporous Membranes with Assemblies of Microspheres as Templates", *Chemistry of Materials*, 10, 1745-1747 (1998).

Park et al., "Macroporous Membranes with Highly Ordered and Three-Dimensionally Interconnected Spherical Pores", *Advanced Materials*, 10, 1045-1048 (1998).

Stein et al., "Colloidal crystal templating of three-dimensionally ordered macroporous solids: materials for photonics and beyond", *Current Opinion in Solid State and Materials Science*, 5, 553-564 (2001).

Stein, A., "Sphere templating methods for periodic porous solids", *Microporous and Mesoporous Materials*, 44-45,227-239 (2001).

Ulbricht, M., "Advanced functional polymer membranes", *Polymer*, 47, 2217-2262 (2006).

Velev et al., "Colloidal crystals as templates for porous materials", *Current Opinion in Colloid and Interface Science*, 5, 56-63 (2000).

Velev et al., "Structured Porous Materials viz Colloidal Crystal Templating: From Inorganic Oxides to Metals", *Advanced Materials*, 12, 531-534 (2000).

Wachner et al., "Utilising Spontaneous Self-Organization of Particles to Prepare Asymmetric, Hierarchical Membranes Comprising Microsieve-Like Parts", *Advanced Materials*, 25, 278-283 (2013).

Wang et al., "Inverse colloidal crystal microfiltration membranes", *Journal of Membrane Science*, 365, 302-310 (2010).

Wong et al., "Colloidal Crystal Films: Advances in Universality and Perfection", *Journal of American Chemical Society*, 125, 15589-15598,(2003).

(56) References Cited

OTHER PUBLICATIONS

Xia et al., "Monodispersed Colloidal Spheres: Old Material with New Applications", *Advanced Materials*, 12, 693-713 (2000).

Xu et al., "Polymer-Silica Hybrid Monolayers as Precursors for Ultrathin Free-Standing Porous Membranes", *Langmuir*, 18, 2363-2367 (2002).

Yan et al., "A Simple and Effective Method for the Preparation of Porous Membranes with Three-Dimensionally Arranged Pores", *Advanced Materials*, 16, 911-915 (2004).

Yan et al., "Hierarchically Struchtured Assembly of Polymer Microsieves, made by a Combination of Phase Separation Micromolding and Float-Casting", *Advanced Materials*, 24, 1551-1557 (2012).

Yan et al., "Polymer Membranes with Two-Dimensionally Arranged Pores Derived from Monolayers of Silica Particles", *Chemistry of Materials*, 16, 1622-1626 (2004).

Zakhidov et al., "Carbon Structures with Three-Dimensional Periodicity at Optical Wavelengths", *Science Magazine*, 262, 897-901 (1998).

European Patent Office, Extended European Search Report in European Patent Application No. 15153092.0 (dated Jul. 27, 2015).

Ahmad, A. et al., "Recent development in additives modifications of polyethersulfone membrane for flux enhancement," *Chemical Engineering Journal*, vol. 223, pp. 246-267 (2013).

Liu, H., et al., "A hard-template process to prepare three-dimensionally macroporous polymer electrolyte for lithium-ion batteries," *Electrochimica Acta*, vol. 121, pp. 328-336 (indicates available online Jan. 15, 2014).

Munakata, H., et al., "Three-dimensionally ordered macroporous polyimide composite membrane with controlled pore size for direct methanol fuel cells," *Journal of Power Sources*, vol. 178, pp. 596-602 (2008).

Weber, J., et al., "Mesoporous Poly(benzimidazole) Networks via Solvent Mediated Templating of Hard Spheres," *Macromolecules*, vol. 40, pp. 1299-1304 (2007).

Wilke, A., et al., "Mesoporous Polymer Networks-Ultraporous DVB Resins by Hard-Templating of Close-Packed Silica Spheres," *Macromolecular Rapid Communications*, vol. 33, pp. 785-790 (2012).

Wu, D., et al., "Design and Preparation of Porous Polymers," *Chemical Reviews*, vol. 112, pp. 3959-4015 (2012).

\* cited by examiner

POROUS POLYMERIC MEMBRANE WITH HIGH VOID VOLUME

BACKGROUND OF THE INVENTION

Polymeric membranes are used to filter a variety of fluids. However, there is a need for membranes that provide high throughput performance.

The present invention provides for ameliorating at least some of the disadvantages of the prior art. These and other advantages of the present invention will be apparent from the description as set forth below.

BRIEF SUMMARY OF THE INVENTION

An embodiment of the invention provides a microporous membrane comprising a single integral layer comprising (i) a first microporous surface; (ii) a second microporous surface; and, (iii) a porous bulk between the first microporous surface and the second microporous surface, wherein the bulk comprises at least a first region and at least a second region; (a) the first region comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size; (b) the second region comprising a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a polymer matrix supporting the third set of pores, wherein the third controlled pore size is greater than the fourth controlled pore size, and wherein the third controlled pore size is at least about 10% greater than, or at least about 10% less than, the first controlled pore size.

In accordance with other embodiments of the invention, filters and filter devices comprising the membranes, as well of methods of making and using the membranes, are provided.

BRIEF DESCRIPTION OF THE SEVERAL VIEWS OF THE DRAWING(S)

FIG. 1 is a scanning electron micrograph (SEM) showing a surface view of the first region of an embodiment of a membrane according to the present invention, showing a first set of pores having connecting outer rims (one pore highlighted in dashed lines), and a second set of pores (one pore highlighted in solid line) located in the connecting outer rims of the first set of pores.

FIG. 2 illustrates hexagonal packing of the first set of pores (formed by dissolving of particles) in the first region of a membrane according to an embodiment of the invention, wherein the hexagonal packing is 74 volume percent. FIG. 2 also illustrates the matrix ("polymer formed interstitials") supporting the first set of pores, and the second set of pores connecting the outer rims of the first set of pores.

FIGS. 3A and 3B diagrammatically illustrate cross-sectional views of membranes according to embodiments of the present invention, showing the first region and the second region (FIG. 3A) and the first, second, and additional region (FIG. 3B).

Figure 6A:
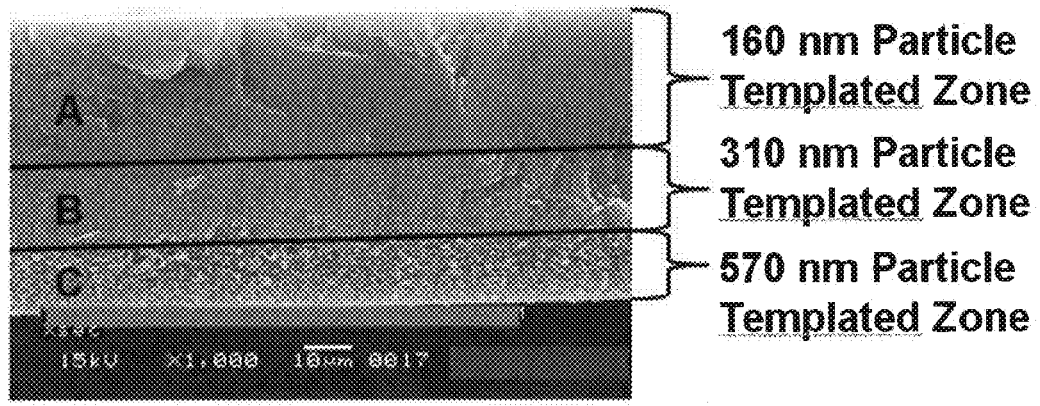
Figure 6B:
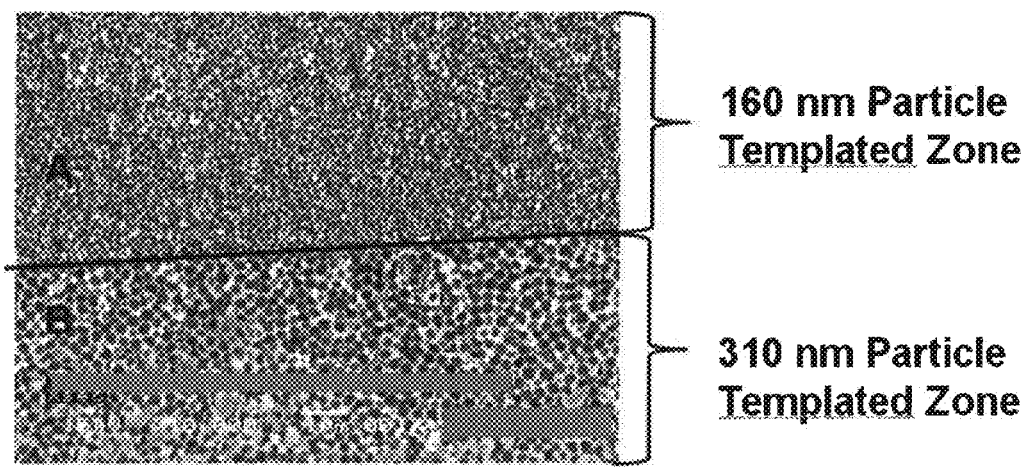
Figure 6C:
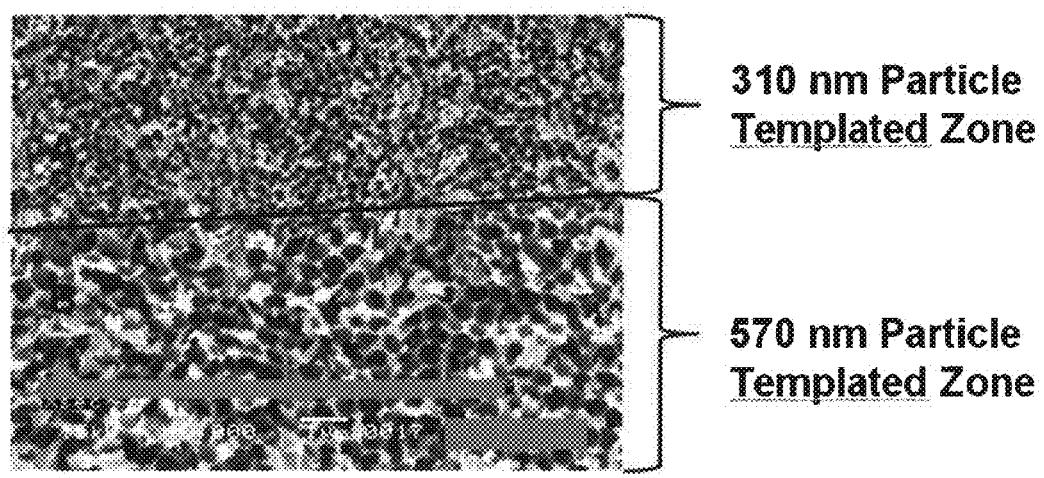

FIGS. 6A, 6B, and 6C are SEMs showing a cross-sectional view (FIG. 6A) and enlarged partial cross-sectional views (FIGS. 6B and 6C) of a membrane according to an embodiment of the present invention, showing the first region, the second region, and an additional region.

Figure 7A:
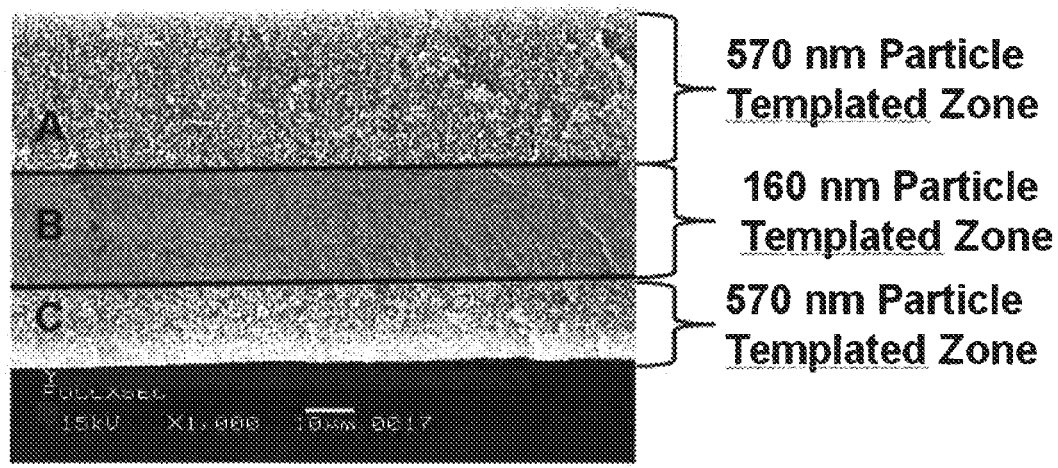
Figure 7B:
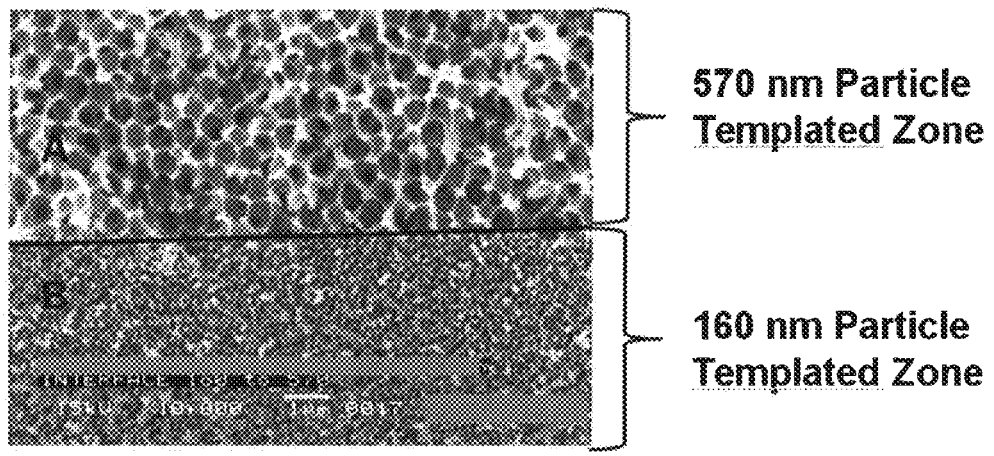
Figure 7C:
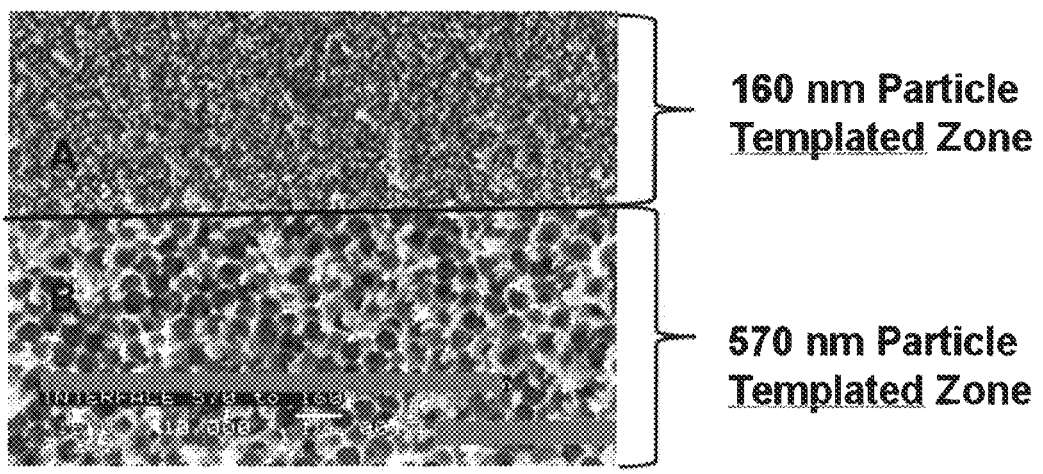

FIGS. 7A, 7B, and 7C are SEMs showing a cross-sectional view (FIG. 7A) and enlarged partial cross-sectional views (FIGS. 7B and 7C) of a membrane according to an embodiment of the present invention, showing the first region, the second region, and an additional region.

DETAILED DESCRIPTION OF THE INVENTION

In accordance with an embodiment of the present invention, a membrane is provided, the membrane comprising a single integral layer comprising (i) a first microporous surface; (ii) a second microporous surface; and, (iii) a porous bulk between the first microporous surface and the second microporous surface, wherein the bulk comprises at least a first region and at least a second region; (a) the first region comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a polymer matrix supporting the first set of pores, wherein the first controlled pore size is greater than the second controlled pore size; (b) the second region comprising a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a polymer matrix supporting the third set of pores, wherein the third controlled pore size is greater than the fourth controlled pore size, and wherein the third controlled pore size is at least about 10% greater than, or at least about 10% less than, the first controlled pore size.

In some embodiments, the bulk comprises at least one additional region, the additional region having at least a fifth set of pores having a fifth controlled pore size. For example, the additional region can comprise a fifth set of pores having outer rims, prepared by removing introduced dissolvable silica nanoparticles, the fifth set of pores having a fifth controlled pore size, and a sixth set of pores connecting the outer rims of the fifth set of pores, the sixth set of pores having a sixth controlled pore size, and a polymer matrix supporting the fifth set of pores, wherein the fifth controlled pore size is greater than the sixth controlled pore size, and wherein the fifth controlled pore size is at least about 10% greater than, or at least about 10% less than, the first controlled pore size. In some embodiments, the fifth controlled pore size is at least about 10% greater than, or at least about 10% less than, or equal to, the first controlled pore size. Alternatively, or additionally, in some embodiments, the fifth controlled pore size is at least about 10% greater than, or at least about 10% less than, or equal to, the third controlled pore size.

The third controlled pore size can be substantially the same as the first controlled pore size and/or the fifth controlled pore size, or the third controlled pore size can be at least about 10% less than the first controlled pore size and/or the fifth controlled pore size, or the third controlled pore size can be at least about 10% greater than the first controlled pore size and/or the fifth controlled pore size. For example, in an embodiment, the pore size of the third set of pores is at least 10%, for example, 20%, 30%, 40%, 50%, 60%, 70%, or 80%, different from the pore size of the first set of pores and/or the fifth set of pores. The pore size of the third set of pores can be larger or smaller than the pore size of the first set of pores and/or the fifth set of pores.

In accordance with an embodiment, the controlled pore size of the first set of pores (and/or the controlled pore size of another set of pores prepared by removing introduced silica nanoparticles) is in the range of from about 50 nm to about 1000 nm, for example, from about 160 nm to about 630 nm. Thus, for example, the pore size of the first set of pores is about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

In some embodiments, the first region contacts the second region, and in some embodiments wherein the first region contacts the second region, the first region is bounded by the first microporous surface and the second region, the second region is bounded by the second microporous surface and the first region. In other embodiments, at least one additional region is located between the first region and the second region.

Typically, in a membrane wherein the controlled pore size of pores having outer rims in a region (e.g., the first region) is less than the controlled pore size of pores having outer rims in another region (e.g., the second region), the region comprising the smaller pores comprises the retentive portion of the membrane.

Embodiments of the membrane can have any number of additional regions, wherein the controlled pore size in the region comprises pores with outer rims, prepared by removing introduced dissolvable nanoparticles, and an additional controlled pore size comprising pores connecting the outer rims of the fourth set of pores, or the controlled pore size comprises pores prepared by phase inversion.

Typically, in any region having a controlled pore size comprising pores with outer rims, prepared by removing introduced dissolvable silica nanoparticles, and an additional controlled pore size comprising smaller pores connecting the outer rims of the pores, the controlled pore size of the smaller pores is in a ratio in the range of about 0.2 to about 0.4 times the controlled pore size of the larger pores.

In any additional region comprising pores prepared by phase inversion, the pore structure can be symmetric or asymmetric.

Membranes according to the invention are integral (i.e., the regions are bonded together such that the membrane behaves as a single structure that does not delaminate or separate under normal use conditions). For example, while making the membranes, portions of each region can infiltrate each other and mix.

Advantageously, membranes according to the invention can be produced using preformed polymers such as polyethersulfone (PES), polyvinylidene fluoride (PVDF), and polyacrylonitrile (PAN), that are commonly used in commercial membranes. Additionally, the nanoparticles can be dissolved without using hydrofluoric acid, for example, the nanoparticles can be dissolved using safer, more environmentally benign solvents.

In other embodiments, filters and filter devices are provided, the filter and filter devices comprising at least one membrane.

A method of filtering fluid is also provided in accordance with another embodiment of the invention, the method comprising passing the fluid through at least one membrane, or a filter comprising at least one membrane, as described above.

In an embodiment, the first and second regions of the membrane (or any additional region of the membrane having pores with outer rims supported by a polymer matrix and pores connecting the outer rims) are prepared by introducing dissolvable silica nanoparticles into solutions comprising one or more membrane forming polymers (typically, the membrane forming polymers are dissolved in a solvent or mixture of solvents), casting first and second nanoparticle-containing polymer solutions (preferably, casting the first nanoparticle-containing polymer solution on a substrate wherein the substrate has been pretreated with a preconditioning or releasing agent; more preferably, wherein the agent has been dried on the substrate before casting the solution thereon), carrying out phase inversion of the nanoparticle-containing polymer solutions to provide a membrane, subsequently dissolving the nanoparticles, and washing the resultant membrane.

Illustratively, an embodiment of the invention comprises (a) casting a (first) dissolvable silica nanoparticle-containing polymer solution onto a substrate; (b) casting a second dissolvable silica nanoparticle-containing polymer solution onto the cast solution of (a); (c) carrying out phase inversion and obtaining a membrane; (d) dissolving the nanoparticles and obtaining a nanoparticle-depleted membrane; and (e) washing the nanoparticle-depleted membrane.

In some embodiments, the method comprises exposing the nanoparticle-containing polymer solution(s) to a temperature in the range of from about 40° C. to about 80° C. for a period in the range of from about 1 minute to about 2 hours.

Preferably (a) comprises casting the solution on a substrate pretreated with a preconditioning agent or a release agent. In some embodiments of the method, the preconditioning agent or the release agent is dried on the substrate before casting the solution on the pretreated substrate. In some embodiments, (b) comprises exposing the nanoparticle-containing polymer solution to a temperature in the range of from about 40° C. to about 80° C. for a period in the range of from about 1 minute to about 2 hours.

Any additional region of the membrane lacking pores with outer rims supported by a polymer matrix and lacking pores connecting the outer rims) is typically prepared by phase inversion.

Figure 1:
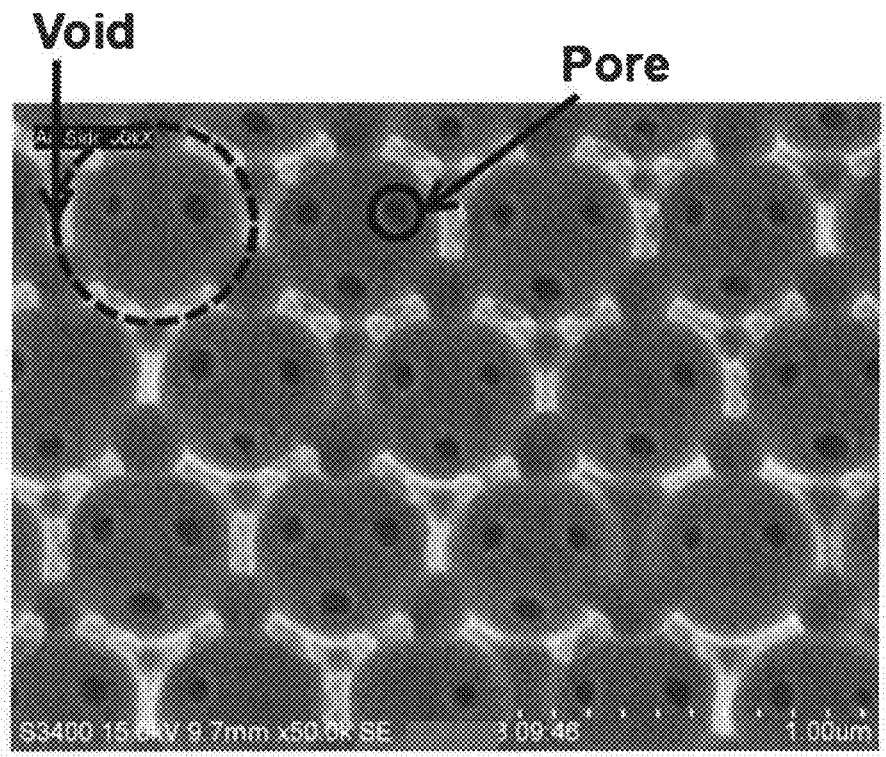

As will be described in more detail below, dissolving the particles creates a first set of pores in the membranes, the first set of pores having outer rims, and located within the outer rims is a second set of pores. As illustrated in FIG. 1, the dashed line highlights an outer rim of a pore in the first set, and the solid line highlights a pore in the second set. The second set of pores allows communication (e.g., fluid flow) from the void within one outer rim into the void of another outer rim.

A variety of dissolvable silica nanoparticles are suitable for use in preparing membranes according to embodiments of the invention. Preferably, the dissolvable particles are not pure silica. Typically, the particles comprise silica nanoparticles ranging in diameter from about 50 nm to about 1000 nm. In an embodiment, the particles comprise silica nanoparticles ranging in diameter from about 50 nm to about 1000 nm, having a density of 1.96 g/cm$^3$ or less. In some embodiments, the silica nanoparticles have a particle density of about 1.93 to about 1.96 g/cm$^3$.

The silica nanoparticles can have a particle size, e.g., diameter, of less than 1000 nm, in particular a particle size of from about 160 nm to about 630 nm. Thus, for example, the nanoparticles have a particle size of about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The silica nanoparticles can be prepared by a method comprising: (a) reacting an orthosilicate and an alcohol or a mixture of alcohols in an aqueous medium in the presence of a salt of a metal of Group Ia or Group IIa, or in the presence of a metalloid compound, optionally in combination with ammonium hydroxide, (b) isolating the resulting nanoparticles, and (c) treating the nanoparticles from (b) with an acid.

In an embodiment, the nanoparticles can be included in the coating composition prior to the acid treatment (c).

In an embodiment, the orthosilicate used in the preparation of the nanoparticles is a tetraalkylorthosilicate. Examples of tetraalkylorthosilicates tetramethylorthosilicate, tetraethylorthosilicate, tetrapropylorthosilicate, tetrabutylorthosilicate, and tetrapentylorthosilicate.

Any suitable alcohol or mixture of alcohols can be used in the preparation of the nanoparticles, for example, the alcohol or mixture of alcohols is selected from methanol, ethanol, propanol, butanol, and mixtures thereof.

The salt of the metal used in the preparation of the nanoparticles can be selected from salts of lithium, sodium, potassium, cesium, magnesium, and calcium. In an embodiment, the salt of the metal is selected from lithium acetate, sodium acetate, sodium metasilicate, sodium formate, potassium acetate, cesium acetate, magnesium acetate, and calcium acetate. In another embodiment, the metalloid compound is a compound of boron, for example, boric acid or a boric acid ester such as alkyl borate. The alkyl borate can be a trialkyl borate such as trimethyl borate or triethyl borate.

The acid employed in (c) of the method above can be a mineral acid or organic acid. Examples of mineral acids include hydrochloric acid, sulfuric acid, and nitric acid, preferably hydrochloric acid or sulfuric acid. Examples of organic acids include acetic acid, formic acid, trifluoroacetic acid, trichloroacetic acid, and p-toluenesulfonic acid, preferably formic acid. The nanoparticles isolated in (b) can be treated with a 1N to 2N acid, e.g., 1N HCl, or 10-50% weight % organic acid in water, e.g., 50% aqueous formic acid, for a period of about 0.5 hr to about 3 hr, preferably about 1 hr to 2 hr. For example, the nanoparticles can be sonicated in an acid bath for the above period. Following the acid treatment, the nanoparticles are isolated from the acid and washed with deionized water and dried under vacuum to obtain the silica nanoparticles.

Illustratively, silica nanoparticles can be prepared as follows. In a 6 L jacketed flask kept at 25° C., 4.8 g lithium acetate dihydrate (LiOAc. 2H$_2$O), 2480 mL deionized water (DI-H$_2$O), 2.9 L anhydrous ethanol (EtOH), and 120 mL 28% w/w NH$_3$ in water is stirred for 30 min at 200 rpm using an overhead mixer with PTFE impellers. A solution of 300 mL EtOH with 200 mL tetraethylorthosilicate (TEOS), which is prepared under dry conditions (<10% relative humidity), is rapidly poured into the 6 L flask, and mixing is increased to 400 rpm and a dry air purge (<1% relative humidity) is utilized for 5 min. Mixing is reduced to 200 rpm, the dry air purge is removed, the flask is sealed, and the reaction continues for a total of 1 h. The particles are purified by centrifugation and re-suspension in EtOH three times.

Typical stock solutions comprising the dissolvable nanoparticles, preferably purified dissolvable nanoparticles, comprise the nanoparticles dispersed at concentrations in the range of from about 30 wt % to about 65 wt % dimethyl formamide (DMF), with in the range of from about 0.001% to about 0.1% triethanolamine (TEA).

A variety of procedures are suitable for dissolving the particles. As noted above, the process should avoid using hydrofluoric acid; rather, the nanoparticles should be dissolved using safer, more environmentally benign solvents. For example, the nanoparticle-containing membrane can be placed in a mineral acid (e.g., HCl or H$_2$SO$_4$) at a concentration in the range of about 0.1 to about 2 moles/L for a period in the range of from about 1 minute to about 1 hour, followed by immersion in an alkaline solution (e.g., KOH or NaOH) at a concentration in the range of about 0.1 to about 4 moles/L for a period in the range of from about 30 minutes to about 24 hours, followed by washing in water (e.g., DI water) for a period in the range of about 30 minutes to about 4 hours. If desired, the membrane can subsequently be dried, e.g., in an oven at a temperature in the range of from about 40° C. to about 80° C. for a period in the range of about 30 minutes to about 2 hours.

Typically, the phase inversion process for producing the membrane from the nanoparticle-containing polymer solution involves casting or extruding a polymer solution into a thin film on the substrate, and precipitating the polymer(s) through one or more of the following: (a) evaporation of the solvent and nonsolvent, (b) exposure to a non-solvent vapor, such as water vapor, which absorbs on the exposed surface, (c) quenching in a non-solvent liquid (e.g., a phase immersion bath containing water, and/or another non-solvent or solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms pores.

A membrane-forming polymer solution is prepared by dissolving the polymer in a solvent or a mixture of solvents. A variety of polymer solutions are suitable for use in the invention, and are known in the art. Suitable polymer solutions can include, polymers such as, for example, polyaromatics; sulfones (e.g., polysulfones, including aromatic polysulfones such as, for example, polyethersulfone (PES), polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles ((PANs) including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone (PVP)).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane)dihydrochloride (V50)), and combinations thereof), and/or minor ingredients such as surfactants and/or release agents.

Typical stock solutions including a polymer (before combining with a solution comprising the dissolvable nanoparticles) comprise in the range of from about 10 wt % to about 35 wt % resin (e.g., PES, PVDF, or PAN), in the range of from about 0 to about 10 wt % PVP, in the range of from about 0 to about 10 wt % PEG, in the range of from about 0 to about 90 wt % NMP, in the range of from about 0 to about 90 wt % DMF, and in the range of from about 0 to about 90 wt % DMAC.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; and 7,208,200.

While a variety of polymeric membranes can be produced in accordance with the invention, in preferred embodiments, the membranes are sulfone membranes (more preferably, polyethersulfone membranes and/or polyarylsulfone membranes), or semi-crystalline membranes (for example, PVDF membranes and/or polyamide membranes).

The membranes can be cast manually (e.g., poured, cast, or spread by hand onto the substrate) or automatically (e.g., poured or otherwise cast onto a moving bed having the substrate thereon).

A variety of casting techniques, including multiple casting techniques, are known in the art and are suitable. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the solutions comprising polymers can be cast by means of a doctor blade with knife gaps in the range from about 100 micrometers to about 500 micrometers, more typically in the range from about 120 micrometers to about 400 micrometers.

A variety of casting speeds are suitable as is known in the art. Typically, the casting speed is at least about 3 feet per minute (fpm), more typically in the range of from about 3 to about 40 fpm, in some embodiments, at least about 5 fpm.

A variety of substrates are suitable for preparing membranes according to embodiments of the invention. Preferably, the substrate is a non-paper substrate. Suitable substrates include, for example, glass, a polyester such as polyethylene terephthalate (PET) (e.g., commercially available as MYLAR); polypropylene; polyethylene (including polyethylene naphthalate (PEN); polyethylene terephthalate glycol (PETG)); polyimide; polyphenylene oxide; nylon; and acrylics.

In some embodiments, the substrate has been pretreated with a preconditioning agent or release agent, preferably, wherein the agent is dried before the particle-containing polymer solution is cast on the pretreated substrate. Without being bound to any particular theory, it is believed that, with respect to some substrates and/or polymers, the use of a preconditioning or release agent improves efficiency in separating the dissolvable particle-containing membrane from the substrate, before dissolving the particles.

Preferably, the preconditioning or release agent does not dissolve in solvents used in the casting formulation, is compatible with membrane processing temperatures, sufficiently adheres to the cast film during thermal processing that it does not delaminate, and dissolves readily in solvents that do not dissolve the membrane resin (such that the membrane can be released from the substrate). Examples of suitable preconditioning or release agents include polyvinyl alcohol (PVOH), polyvinylpyrrolidone (PVP), poly(acrylic acid), and poly(methacrylic acid).

Illustratively, a PVOH stock solution can be prepared with about 5 wt % to about 15 wt % PVOH in deionized water, and cast on a substrate using a casting bar with a gap in the range of from about 1 to about 10 mil, and dried in an oven at a temperature in the range of from about 40° C. to about 80° C. for a period in the range of from about 1 minute to about 2 hours.

The membranes can have any suitable pore structure, e.g., a pore size (for example, as evidenced by bubble point, or by $K_L$ as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

Figure 2:
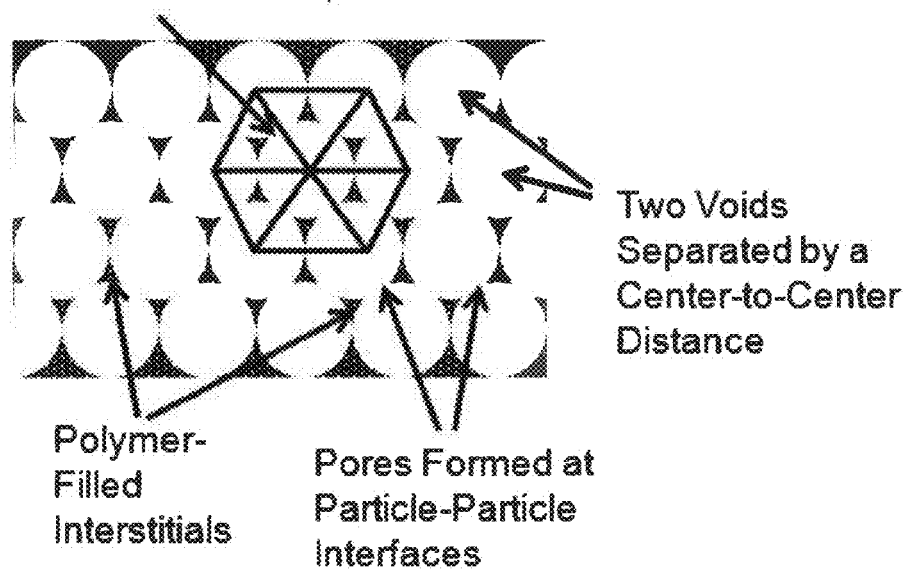

Additionally, the membranes have a desirable hexagonal structure resulting from the first set of pores in the bulk of the membrane. As illustrated in FIG. 2 (showing the first set of pores resulting from dissolving the introduced particles and the hexagonal structure representing the maximum void fraction), the maximum void fraction is 74 volume percent, and regions of membranes according to embodiments of the invention have in the range of from about 66% to about 73% void fraction.

The microporous surfaces of the membranes can have any suitable mean pore size, e.g., as determined by, for example, calculating the average surface pore size from an SEM at 5,000× or 20,000× magnification.

Typically, the thickness of membranes according to embodiments of the invention is in the range of about 1 mil to about 10 mils, preferably, in the range of from about 2 mils to about 5 mils.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane has a CWST of greater than about 70 dynes/cm (about $70 \times 10^{-5}$ N/cm), more typically greater than about 73 dynes/cm (about $73 \times 10^{-5}$ N/cm), and can have a CWST of about 78 dynes/cm (about $78 \times 10^{-5}$ N/cm) or more. In some embodiments, the membrane has a CWST of about 82 dynes/cm (about $82 \times 10^{-5}$ N/cm) or more.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van de Graff generator, ultraviolet light, electron beam, or to various other forms of radiation, or by surface etching or deposition using a plasma treatment.

A variety of fluids can be filtered in accordance with embodiments of the invention. Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the membrane can have a variety of configurations, including planar, pleated, and/or hollow cylindrical.

Membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonated resin.

The following examples further illustrate the invention but, of course, should not be construed as in any way limiting its scope.

In the following examples, SEM analysis and porometry are used to determine the second controlled pore size of the second set of pores, that are located in the connections between the outer rims of the first set of pores, as well as to determine the fourth controlled pore size of the fourth set of pores, that are located in the connections between the outer rims of the third set of pores, and the sixth controlled pore size of the sixth set of pores, that are located in the connections between the outer rims of the fifth set of pores.

Example 1

This example demonstrates the preparation of a membrane according to an embodiment of the invention, having a first region in contact with a second region, wherein the first region has a first set of pores having outer rims, prepared by removing introduced dissolvable nanoparticles, the first set of pores having a first controlled pore size of about 310 nm, and a second set of pores connecting the outer rims of the first set of pores, the second set of pores having a second controlled pore size of about 93 nm, and a polymer matrix supporting the first set of pores, and the second region comprises a third set of pores having a third controlled pore size of about 570 nm, and a fourth set of pores connecting the outer rims of the third set of pores, the fourth set of pores having a fourth controlled pore size of about 171 nm, and a polymer matrix supporting the third set of pores, wherein the first controlled pore size is about 54% less than the third controlled pore size.

Dissolvable nanoparticles (for preparing the first region) are prepared in stock solution as follows: In a jacketed flask kept at 25° C., a solution is prepared consisting of 0.9 mol/L ammonia ($NH_3$), 9.16 mol/L ethanol (ETOH), 23.07 mol/L deionized (DI) water, 0.15 mol/L tetraethoxysilane (TEOS) and 0.0078 mol/L lithium acetate ($CH_3COOLi$), and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 55% (w/w) particles.

The first polymer (resin) stock solution is prepared as follows: In a jacketed kettle kept at 50° C. using a circulating bath, 17% (w/w) PAN resin (Scientific Polymer Products), 0.3% PVP K30, and 82.7% DMF are mixed at 100 rpm using an overhead mixer for 5 hr. The solution is placed under vacuum at 200 mbar for 30 min. to deaerate the solution.

The first casting solution is prepared as follows: The resin stock solution and the particle stock solution are combined in a flask and mixed at 30,000 rpm for 2 min with final concentrations of 29% (w/w) particles, 8% PAN, <0.1% PVP, and 63% DMF, followed by deaeration at 200 mbar for 30 min.

PVOH stock solution is prepared as follows: In a jacketed kettle kept at 90° C., a solution is prepared by combining 10% w/w PVOH (96% Hydrolyzed, Scientific Polymer Products) with 90% DI water and stirring at 200 rpm for 16 hr. Using a casting bar gapped to 5 mil, PVOH stock solution is cast onto a glass plate and placed in an oven at 80° C. for 2 hr. to form a film.

Using a casting bar gapped to 5 mil, the first casting solution is cast on the film on the PVOH-coated plate, and placed in an oven for 20 min at 70° C., forming a film.

Dissolvable nanoparticles (for preparing the second region) are prepared in stock solution as follows: In a jacketed flask kept at 25° C., a solution is prepared consisting of 1 mol/L $NH_3$, 8.24 mol/L ETOH, 1 mol/L methanol (MeOH), 23.7 mol/L DI water, 0.15 mol/L TEOS and 0.0078 mol/L sodium metasilicate ($Na_2SiO_3$), and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 63% (w/w) particles.

The second polymer (resin) solution (for preparing the second region) is prepared as follows: In a jacketed kettle kept at 50° C. using a circulating bath, 17% (w/w) PAN resin (Scientific Polymer Products), 0.3% PVP K30, and 82.7% DMF are mixed at 100 rpm using an overhead mixer for 5 hr. The solution is placed under vacuum at 200 mbar for 30 min. to deaerate the solution.

The second casting solution is prepared as follows: The second resin stock solution and the particle stock solution are combined in a flask and mixed at 30,000 rpm for 2 min with final concentrations of 30% (w/w) particles, 9% PAN, <0.1% PVP, and 61% DMF, followed by deaeration at 200 mbar for 30 min.

Using a 5 mil casting bar, the second casting solution is cast on the film on the PVOH-coated plate, placed in an oven for 20 min at 70° C. to form a membrane, then immersed in DI water at 60° C. for 15 min. The membrane is soaked in 1 mol/L HCl for 30 min., followed by soaking in 0.5 mol/L KOH for 18 hr. Subsequently, the membrane is washed with DI water at 25° C. for 2 hr. and dried at 70° C. for 30 min.

Figure 3A:
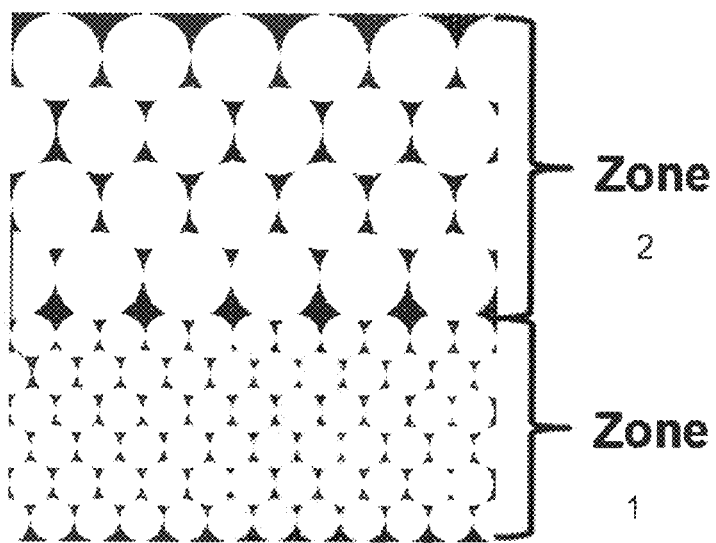
Figure 4A:
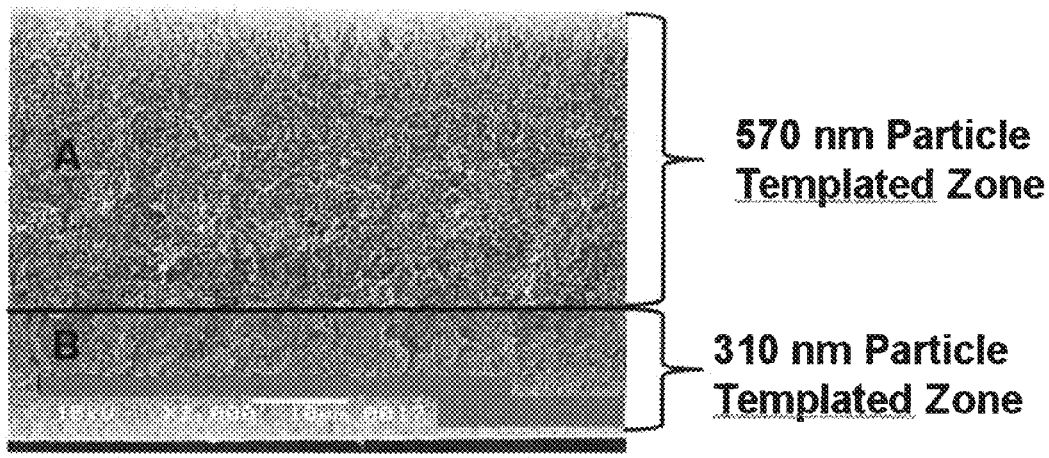
FIGS. 4A and 4B are SEMs showing a cross-sectional view (FIG. 4A) and an enlarged partial cross-sectional view (FIG. 4B) of a membrane according to an embodiment of the present invention, showing the first region and the second region.
Figure 4B:
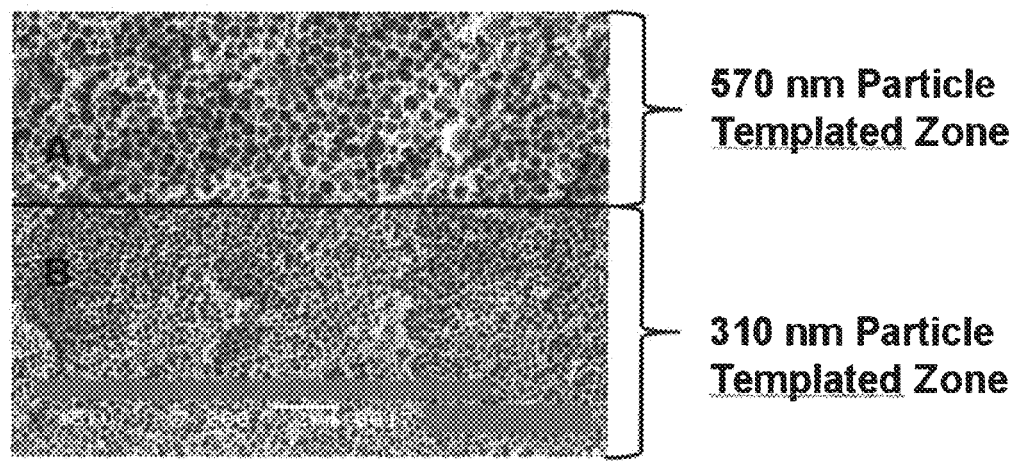

A diagrammatic cross-sectional view of the membrane is shown in FIG. 3A. Cross-sectional and enlarged partial cross-sectional SEM views of the membrane are shown in FIGS. 4A and 4B.

Example 2

This example demonstrates the preparation of a membrane according to another embodiment of the invention, having a first region in contact with a second region, wherein the first region has a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, wherein the first controlled pore size is greater than the second controlled pore size, and the second region comprises a third set of pores having a third controlled pore size of about 310 nm, and a fourth set of pores connecting the outer rims of the third set of pores, the fourth set of pores having a fourth controlled pore size of about 93 nm, and a polymer matrix supporting the third set of pores, wherein the third controlled pore size is greater than the fourth controlled pore size, and wherein the third controlled pore size is about 54% less than the first controlled pore size.

Dissolvable nanoparticles (for preparing the first region) are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The first polymer (resin) stock solution (to be combined with the first particle stock solution) is prepared as follows: In a jacketed kettle kept at 47° C. using a circulating bath, 33% (w/w) PES resin (BASF, Ultrason E 6020 P), 2% PEG-400, 13% (w/w) NMP, and 52% DMF are mixed at 800 rpm using an overhead mixer for 4 hr. The solution is placed under vacuum at 200 mbar for 30 minutes to deaerate the solution.

A first casting solution is prepared as follows: The resin stock solution and the particle stock solution are combined in a flask and mixed at 30,000 rpm for 2 min with final concentrations of 40% (w/w) particles, 14% PES, 1% PEG-400, 5% NMP, and 40% DMF, followed by deaeration at 200 mbar for 30 min.

Dissolvable nanoparticles (for preparing the second region) are prepared in stock solution as follows: In a jacketed flask kept at 25° C., a solution is prepared consisting of 0.9 mol/L ammonia ($NH_3$), 9.16 mol/L ETOH, 23.07 mol/L DI water, 0.15 mol/L tetraethoxysilane (TEOS) and 0.0078 mol/L $CH_3COOLi$, and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The second polymer (resin) stock solution (to be combined with the second particle stock solution) is prepared as follows: In a jacketed kettle kept at 47° C. using a circulating bath, 33% (w/w) PES resin (BASF, Ultrason E 6020 P), 2% PEG-400, 13% (w/w) NMP, and 52% DMF are mixed at 800 rpm using an overhead mixer for 4 hr. The solution is placed under vacuum at 200 mbar for 30 minutes to deaerate the solution.

A second casting solution is prepared as follows: The resin stock solution and the particle stock solution are combined in a flask and mixed at 30,000 rpm for 2 min with final concentrations of 40% (w/w) particles, 14% PES, 1% PEG-400, 5% NMP, and 40% DMF, followed by deaeration at 200 mbar for 30 min.

Using a 5 mil gapped casting bar, the first casting solution is cast on a polypropylene support, immediately followed by casting the second casting solution on the first solution, using a 10 mil gapped casting bar, and placed in an oven for 30 min at 50° C. to form a membrane, then immersed in DI water at 80° C. for 1 hr. The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

Figure 5A:
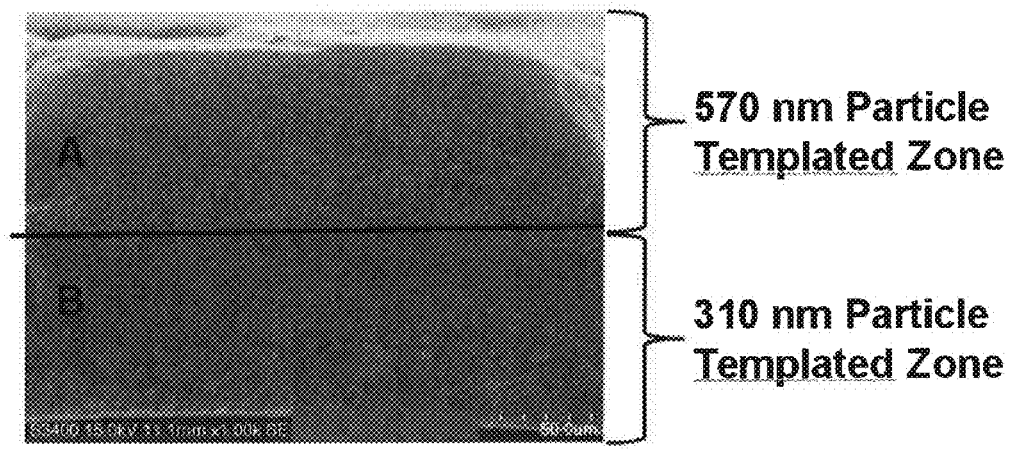
FIGS. 5A and 5B are SEMs showing a cross-sectional view (FIG. 5A) and an enlarged partial cross-sectional view (FIG. 5B) of a membrane according to an embodiment of the present invention, showing the first region and the second region.
Figure 5B:
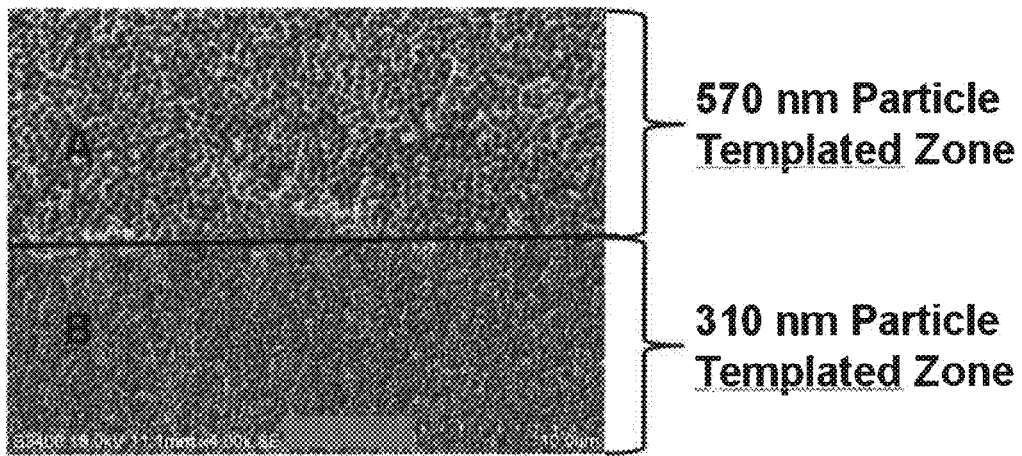

Cross-sectional, and enlarged partial cross-sectional SEM views of the membrane are shown in FIGS. 5A and 5B.

Example 3

This example demonstrates the preparation of a membrane according to another embodiment of the invention, having a first region in contact with a second region, wherein the first region has a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, and the second region comprises a third set of pores having a third controlled pore size of about 310 nm, and a fourth set of pores connecting the outer rims of the third set of pores, the fourth set of pores having a fourth controlled pore size of about 93 nm, and a polymer matrix supporting the third set of pores, wherein the third controlled pore size is about 54% less than the first controlled pore size.

Dissolvable nanoparticles (for preparing the first region) are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The first polymer (resin) stock solution (to be combined with the first particle stock solution) is prepared as follows: In a jacketed kettle kept at 38° C. using a circulating bath, 33% (w/w) PVDF resin (Solvay), and 67% DMAC are mixed at 800 rpm using an overhead mixer for 12 hr. The solution is placed under vacuum at 200 mbar for 30 min. to deaerate the solution.

The first casting solution is prepared as follows: The first resin stock solution and the particle stock solution are combined in a flask and mixed at 30,000 rpm for 2 min with final concentrations of 35% (w/w) particles, 14% PVDF, 27% DMAC, and 24% DMF, followed by deaeration at 200 mbar for 30 min.

Using a casting bar gapped to 5 mil, the first casting solution is cast onto a glass plate, and placed in an oven at 50° C. for 30 min.

Dissolvable nanoparticles (for preparing the second region) are prepared in stock solution as follows: In a jacketed flask kept at 25° C., a solution is prepared consisting of 0.9 mol/L $NH_3$, 9.16 mol/L ETOH, 23.07 mol/L DI water, 0.15 mol/L tetraethoxysilane (TEOS) and 0.0078 mol/L $CH_3COOLi$, and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The second polymer (resin) stock solution (to be combined with the second particle stock solution) is prepared as follows: In a jacketed kettle kept at 38° C. using a circulating bath, 33% (w/w) PVDF resin (Solvay), and 67% DMAC are mixed at 800 rpm using an overhead mixer for 12 hr. The solution is placed under vacuum at 200 mbar for 30 min. to deaerate the solution.

The second casting solution is prepared as follows: The second resin stock solution and the second particle stock solution are combined in a flask and mixed at 30,000 rpm for 2 min with final concentrations of 35% (w/w) particles, 14% PVDF, 27% DMAC, and 24% DMF, followed by deaeration at 200 mbar for 30 min.

Using a 10 mil gapped casting bar, the second casting solution is cast on the coated glass plate, and placed in an oven at 50° C. for 30 min.

The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

Example 4

This example demonstrates the preparation of a membrane according to another embodiment of the invention, having a first region, a second region, and an additional region, wherein the additional region is in contact with the second region, and the second region is in contact with the first region, i.e., the second region is located between the additional region and the first region, wherein the first region has a first set of pores having outer rims, prepared by removing introduced dissolvable nanoparticles, the first set of pores having a first controlled pore size 160 nm, and a second set of pores connecting the outer rims of the first set of pores, the second set of pores having a second controlled pore size of about 32 nm to about 48 nm, and a polymer matrix supporting the first set of pores, and the second region comprises a third set of pores having a third controlled pore size of about 310 nm, and a fourth set of pores connecting the outer rims of the third set of pores, the fourth set of pores having a fourth controlled pore size of about 93 nm, and a polymer matrix supporting the third set of pores, wherein the first controlled pore size is about 51% less than the third controlled pore size, and wherein the additional region comprises a fifth set of pores having a fifth controlled pore size of about 570 nm, and a sixth set of pores connecting the outer rims of the fifth set of pores, the sixth set of pores having a sixth controlled pore size of about 171 nm, and a polymer matrix supporting the fifth set of pores, wherein the first controlled pore size is about 28% less than the fifth controlled pore size, and wherein the third controlled pore size is about 54% less than the fifth controlled pore size.

Dissolvable nanoparticles (for preparing the first region) are prepared in stock solution as follows: In a jacketed flask kept at 25° C., a solution is prepared consisting of 0.3 mol/L $NH_3$, 9.16 mol/L ETOH, 23.74 mol/L DI water, 0.15 mol/L TEOS, and 0.0078 mol/L lithium acetate ($CH_3COOLi$), and stirred at 200 rpm for 1 hr. Dynamic light scattering and SEM show particle diameters of approximately 160 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 55% (w/w) particles.

The first polymer (resin) stock solution (to be combined with the first particle stock solution) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A first casting solution is prepared as follows: The first resin stock solution and the first particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

Using a casting bar gapped to 5 mil, PVOH stock solution (prepared as described in Example 1) is cast onto a glass plate and placed in an oven at 80° C. for 2 hr. to form a film. Subsequently, the first casting solution is cast onto the PVOH film using a 3 mil gapped casting bar and placed in an oven for 15 min at 60° C.

Dissolvable nanoparticles (for preparing the second region) are prepared in stock solution as follows: In a jacketed flask kept at 25° C., a solution is prepared consisting of 0.9 mol/L $NH_3$, 9.16 mol/L ETOH, 23.07 mol/L DI water, 0.15 mol/L TEOS, and 0.0078 mol/L $CH_3COOLi$, and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 55% (w/w) particles.

A second polymer (resin) stock solution (to be combined with the second particle stock solution for preparing the second region) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A second casting solution is prepared as follows: The second resin stock solution and the second particle stock solution are combined in a flask along with PVP K90 and PEG-1000 and mixed at 30,000 rpm for 2 min with final concentrations of 40% (w/w) particles, 11% PES, 6% NMP, 42% DMF, 0.5% PVP K90, and 0.5% PEG-1000, followed by deaeration at 200 mbar for 30 min.

Using a casting bar gapped to 5 mil, the second casting solution is cast onto the coated glass plate and placed in an oven at for 15 min at 60° C.

Dissolvable nanoparticles (for preparing the additional region) are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 63% (w/w) particles.

A third polymer (resin) stock solution (to be combined with the third particle stock solution for preparing the additional region) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A third casting solution is prepared as follows: The third resin stock solution and the third particle stock solution are combined in a flask along with PVP K90 and PEG-1000 and mixed at 30,000 rpm for 2 min with final concentrations of 40% (w/w) particles, 11% PES, 6% NMP, 42% DMF, 0.5% PVP K90, and 0.5% PEG-1000, followed by deaeration at 200 mbar for 30 min.

Using a casting bar gapped to 7 mil, the second casting solution is cast onto the coated glass plate and placed in an oven for 15 min at 60° C.

The membrane is immersed in DI water at 80° C. for 1 hr. and soaked in 1 mol/L HCl for 30 min., followed by soaking in 2 mol/L KOH for 18 hr. Subsequently, the membrane is washed with DI water at 25° C. for 2 hr. and dried at 70° C. for 30 min.

Cross-sectional, and enlarged partial cross-sectional SEM views of the membrane are shown in FIGS. 6A, 6B (first and second regions), and 6C (second and additional regions).

Example 5

This example demonstrates the preparation of a membrane according to another embodiment of the invention, having a first region, a second region, and an additional region, wherein the additional region is in contact with the second region, and the second region is in contact with the first region, i.e., the second region is located between the additional region and the first region, wherein the first region has a first set of pores having outer rims, prepared by removing introduced dissolvable nanoparticles, the first set of pores having a first controlled pore size of about 310 nm, and a second set of pores connecting the outer rims of the first set of pores, the second set of pores having a second controlled pore size of about 93 nm, and a polymer matrix supporting the first set of pores, and the second region comprises a third set of pores having a third controlled pore size of about 160 nm, and a fourth set of pores connecting the outer rims of the third set of pores, the fourth set of pores having a fourth controlled pore size of about 48 nm, and a polymer matrix supporting the third set of pores, wherein the third controlled pore size is about 51% less than the first controlled pore size, and wherein the additional region comprises a fifth set of pores having a fifth controlled pore size of about 570 nm, and a sixth set of pores connecting the outer rims of the fifth set of pores, the sixth set of pores having a sixth controlled pore size of about 171 nm, and a polymer matrix supporting the fifth set of pores, wherein the first controlled pore size is about 54% less than the fifth controlled pore size, and wherein the third controlled pore size is about 28% less than the fifth controlled pore size.

Dissolvable nanoparticles (for preparing the first region) are prepared in stock solution as follows: In a jacketed flask kept at 25° C., a solution is prepared consisting of 0.9 mol/L $NH_3$, 9.16 mol/L ETOH, 23.07 mol/L DI water, 0.15 mol/L TEOS, and 0.0078 mol/L $CH_3COOLi$, and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 55% (w/w) particles.

A first polymer (resin) stock solution (to be combined with the first particle stock solution for preparing the first region) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A first casting solution is prepared as follows: The first resin stock solution and the first particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

Using a casting bar gapped to 5 mil, PVOH stock solution (prepared as described in Example 1) is cast onto a glass plate and placed in an oven at 80° C. for 2 hr. to form a film. Subsequently, the first casting solution is cast onto the PVOH film using a 3 mil gapped casting bar and placed in an oven for 15 min at 60° C.

Dissolvable nanoparticles (for preparing the second region) are prepared in stock solution as follows: In a jacketed flask kept at 25° C., a solution is prepared consisting of 0.3 mol/L $NH_3$, 9.16 mol/L ETOH, 23.74 mol/L DI water, 0.15 mol/L TEOS, and 0.0078 mol/L $CH_3COOLi$, and stirred at 200 rpm for 1 hr. Dynamic light scattering and SEM show particle diameters of approximately 160 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 55% (w/w) particles.

The second polymer (resin) stock solution (to be combined with the second particle stock solution) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A second casting solution is prepared as follows: The second resin stock solution and the second particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

Using a casting bar gapped to 5 mil, the second casting solution is cast onto the coated glass plate and placed in an oven at for 15 min at 60° C.

Dissolvable nanoparticles (for preparing the additional region) are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 63% (w/w) particles.

A third polymer (resin) stock solution (to be combined with the third particle stock solution for preparing the additional region) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A third casting solution is prepared as follows: The third resin stock solution and the third particle stock solution are combined in a flask along with PVP K90 and PEG-1000 and mixed at 30,000 rpm for 2 min with final concentrations of 40% (w/w) particles, 11% PES, 6% NMP, 42% DMF, 0.5% PVP K90, and 0.5% PEG-1000, followed by deaeration at 200 mbar for 30 min.

Using a casting bar gapped to 7 mil, the third casting solution is cast onto the coated glass plate and placed in an oven at for 15 min at 60° C.

The membrane is immersed in DI water at 80° C. for 1 hr. and soaked in 1 mol/L HCl for 30 min., followed by soaking in 2 mol/L KOH for 18 hr. Subsequently, the membrane is washed with DI water at 25° C. for 2 hr. and dried at 70° C. for 30 min.

Figure 3B:
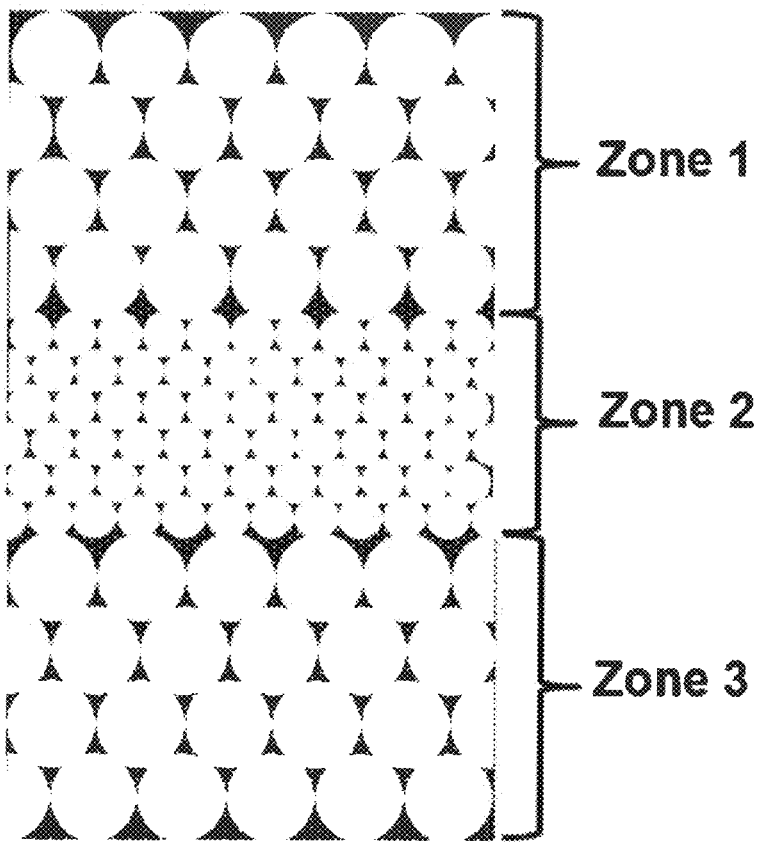

A diagrammatic cross-sectional view of the membrane is shown in FIG. 3B.

Example 6

This example demonstrates the preparation of a membrane according to another embodiment of the invention, having a first region, a second region, and an additional region, wherein the additional region is in contact with the second region, and the second region is in contact with the first region, i.e., the second region is located between the additional region and the first region, wherein the first region has a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a polymer matrix supporting the first set of pores, wherein the first controlled pore size is greater than the second controlled pore size, and the second region comprises a third set of pores having a third controlled pore size of about 160 nm, and a fourth set of pores connecting the outer rims of the third set of pores, the fourth set of pores having a fourth controlled pore size of about 48 nm, and a polymer matrix supporting the third set of pores, wherein the third controlled pore size is about 28% less than the first controlled pore size, and wherein the additional region comprises a fifth set of pores having a fifth controlled pore size 570 nm, and a sixth set of pores connecting the outer rims of the fifth set of pores, the sixth set of pores having a sixth controlled pore size of about 171 nm, and a polymer matrix supporting the fifth set of pores, wherein the first controlled pore size is equal to the fifth controlled pore size and the third controlled pore size is about 28% less than the fifth controlled pore size.

Dissolvable nanoparticles (for preparing the first region) are prepared in stock solution as follows: In a jacketed flask kept at 25° C., a solution is prepared consisting of 1 mol/L $NH_3$, 8.24 mol/L ETOH, 1 mol/L MeOH, 23.7 mol/L DI water, 0.15 mol/L TEOS and 0.0078 mol/L $Na_2SiO_3$, and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% TEA three times. The stock solution has a final concentration of 63% (w/w) particles.

The first polymer (resin) stock solution (to be combined with the first particle stock solution) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A first casting solution is prepared as follows: The first resin stock solution and the first particle stock solution are combined in a flask along with PVP and PEG-1000 and mixed at 30,000 rpm for 2 min with final concentrations of 40% (w/w) particles, 11% PES, 6% NMP, 42% DMF, 0.5% PVP K90, and 0.5% PEG-1000, followed by deaeration at 200 mbar for 30 min.

Using a casting bar gapped to 5 mil, PVOH stock solution (prepared as described in Example 1) is cast onto a glass plate and placed in an oven at 80° C. for 2 hr. to form a film. Subsequently, the first casting solution is cast onto the PVOH film using a 3 mil gapped casting bar and placed in an oven for 15 min at 60° C.

Dissolvable nanoparticles (for preparing the second region) are prepared in stock solution as follows: In a jacketed flask kept at 25° C., a solution is prepared consisting of 0.3 mol/L $NH_3$, 9.16 mol/L ETOH, 23.74 mol/L DI water, 0.15 mol/L TEOS, and 0.0078 mol/L $CH_3COOLi$, and stirred at 200 rpm for 1 hr. Dynamic light scattering and SEM show particle diameters of approximately 160 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 55% (w/w) particles.

The second polymer (resin) stock solution (to be combined with the second particle stock solution) is prepared as follows: In a jacketed kettle kept at 40° C. using a circulating bath, 30% (w/w) PES resin (BASF, Ultrason E 6020 P), 15% (w/w) NMP, and 55% (w/w) DMF are mixed at 800 rpm using an overhead mixer for 4 hr. The solution is placed under vacuum at 200 mbar for 30 minutes to deaerate the solution.

A second casting solution is prepared as follows: The second resin stock solution and the second particle stock solution are combined in a flask along with PVP K90 and PEG-1000 and mixed at 30,000 rpm for 2 min with final concentrations of 42% (w/w) particles, 11% PES, 5% NMP, 41% DMF, 0.5% PVP K90, and 0.5% PEG-1000, followed by deaeration at 200 mbar for 30 min.

Using a casting bar gapped to 5 mil, the second casting solution is cast onto the coated glass plate and placed in an oven at for 15 min at 60° C.

Dissolvable nanoparticles (for preparing the additional region), the third polymer (resin) stock solution, and the third casting solution, are prepared as described above with respect to the first set of particles and solutions.

Using a casting bar gapped to 7 mil, the third casting solution is cast onto the coated glass plate and placed in an oven at for 15 min at 60° C.

The membrane is immersed in DI water at 80° C. for 1 hr. and soaked in 1 mol/L HCl for 30 min., followed by soaking in 2 mol/L KOH for 18 hr. Subsequently, the membrane is washed with DI water at 25° C. for 2 hr. and dried at 70° C. for 30 min.

Cross-sectional, and enlarged partial cross-sectional SEM views of the membrane are shown in FIGS. 7A, 7B (first and second regions), and 7C (second and additional regions).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A microporous membrane comprising
(A) a single integral layer comprising
   (i) a first microporous surface;
   (ii) a second microporous surface; and,
   (iii) a porous bulk between the first microporous surface and the second microporous surface, wherein the bulk comprises a first region, a second region, and at least one additional region located between the first region and the second region;
      (a) the first region comprising a first set of hexagonally packed pores having outer rims, prepared by removing introduced dissolvable silica nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size, and the first controlled pore size is about 540 to about 620 nm;
      (b) the second region comprising a third set of hexagonally packed pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size, and wherein the third controlled pore size is about 280 nm to about 340 nm; and,
      (c) the additional region comprising a fifth set of hexagonally packed pores having outer rims, prepared by removing introduced dissolvable silica nanoparticles, the fifth set of pores having a fifth controlled pore size, and a sixth set of pores connecting the outer rims of the fifth set of pores, the sixth set of pores having a sixth controlled pore size, and a third polymer matrix supporting the fifth set of pores, wherein the fifth controlled pore size is greater than the sixth controlled pore size, and wherein the fifth controlled pore size is about 160 nm to about 180 nm, and wherein the first polymer matrix, the second polymer matrix, and the third polymer matrix, each comprise polyethersulfone or each comprise polyacrylonitrile or each comprise polyvinylidene fluoride;
   wherein the microporous membrane has a void volume fraction of about 66% to 74%.

2. A method of filtering a fluid, the method comprising passing the fluid through the membrane of claim 1.

3. A method of making a microporous membrane, the method comprising
(A) a single integral layer comprising
   (i) a first microporous surface;
   (ii) a second microporous surface; and,
   (iii) a porous bulk between the first microporous surface and the second microporous surface, wherein the bulk comprises a first region, a second region, and at least one additional region located between the first region and the second region;
      (a) the first region comprising a first set of hexagonally packed pores having outer rims, prepared by removing introduced dissolvable silica nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size, and the first controlled pore size is about 540 to about 620 nm;
      (b) the second region comprising a third set of hexagonally packed pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is about 280 nm to about 340 nm; and,
      (c) the additional region comprising a fifth set of hexagonally packed pores having outer rims, prepared by removing introduced dissolvable silica nanoparticles, the fifth set of pores having a fifth controlled pore size, and a sixth set of pores connecting the outer rims of the fifth set of pores, the sixth set of pores having a sixth controlled pore size, and a third polymer matrix supporting the fifth set of pores, wherein the fifth controlled pore size is greater than the sixth controlled pore size, and wherein the fifth controlled pore size is about 160 nm to about 180 nm, and wherein the first polymer matrix, the second polymer matrix, and the third polymer matrix, each comprise polyethersulfone or each comprise polyacrylonitrile or each comprise polyvinylidene fluoride;
   wherein the microporous membrane has a void volume fraction of about 66% to 74%;
the method comprising:
(a) casting a first dissolvable silica nanoparticle-containing polymer solution onto a substrate, wherein dissolvable silica nanoparticles in the first dissolvable silica nanoparticle-containing polymer solution contact each other at an interface, wherein the first dissolvable silica nanoparticle-containing polymer solution comprises polyethersulfone or polyacrylonitrile or polyvinylidene fluoride;
(b) casting a second dissolvable silica nanoparticle-containing polymer solution onto the cast solution of (a), wherein dissolvable silica nanoparticles in the second dissolvable silica nanoparticle-containing polymer solution contact each other at an interface, wherein the second dissolvable silica nanoparticle-containing polymer solution includes polyethersulfone or polyacrylonitrile or polyvinylidene fluoride;
(c) casting a third dissolvable silica nanoparticle-containing polymer solution onto the cast solution of (b), wherein dissolvable silica nanoparticles in the third dissolvable silica nanoparticle-containing polymer solution contact each other at an interface, wherein the third dissolvable silica nanoparticle-containing polymer solution includes polyethersulfone or polyacrylonitrile or polyvinylidene fluoride;
(d) carrying out phase inversion and obtaining a membrane;
(e) dissolving the nanoparticles and obtaining a nanoparticle-depleted membrane; and
(f) washing the nanoparticle-depleted membrane.

* * * * *